United States Patent
Jakowski et al.

(10) Patent No.: US 7,502,689 B2
(45) Date of Patent: Mar. 10, 2009

(54) DETERMINATION OF AN ATMOSPHERIC STATE

(75) Inventors: Norbert Jakowski, Neustrelitz (DE); Erik Borg, Joachimsthal (DE); Stanimir Stankov, Neustrelitz (DE); Dietmar Klähn, Neustrelitz (DE)

(73) Assignee: Deutsches Zentrum für Luft—und Raumfahrt e.V., Bonn (DE)

( * ) Notice: Subject to any disclaimer, the term of this patent is extended or adjusted under 35 U.S.C. 154(b) by 525 days.

(21) Appl. No.: 11/240,163

(22) Filed: Sep. 30, 2005

(65) Prior Publication Data

US 2006/0080038 A1    Apr. 13, 2006

(30) Foreign Application Priority Data

Oct. 1, 2004  (DE) ............... 10 2004 048 327
Aug. 9, 2005  (DE) ............... 10 2005 038 391

(51) Int. Cl.
G06F 19/00    (2006.01)

(52) U.S. Cl. ............... 702/2; 702/3; 702/4; 702/5; 342/357.13; 342/26 D; 342/26 B; 342/357.02; 342/357.01; 73/170.16; 73/170.24; 73/170.27; 73/170.28; 73/178 R

(58) Field of Classification Search ............... 702/2, 702/3, 4, 5; 701/214; 342/357.13, 26 D, 342/357.02, 357.01, 26 B; 73/170.16, 170.24, 73/170.27, 170.28, 178 R See application file for complete search history.

(56) References Cited

U.S. PATENT DOCUMENTS

| | | | | |
|---|---|---|---|---|
| 5,230,076 A | * | 7/1993 | Wilkinson | ............... 455/62 |
| 5,428,358 A | * | 6/1995 | Gardner | ............... 342/26 D |
| 5,574,639 A | * | 11/1996 | Qian et al. | ............... 708/300 |
| 5,673,366 A | * | 9/1997 | Maynard et al. | ............... 706/14 |
| 5,828,336 A | * | 10/1998 | Yunck et al. | ............... 342/357.02 |
| 5,910,905 A | * | 6/1999 | Qian et al. | ............... 708/311 |
| 5,943,629 A | * | 8/1999 | Ballard et al. | ............... 702/2 |
| 6,407,700 B1 | * | 6/2002 | Giffard | ............... 342/357.12 |
| 6,683,609 B1 | * | 1/2004 | Baron et al. | ............... 345/419 |
| 6,859,690 B2 | * | 2/2005 | Asher et al. | ............... 701/13 |
| 2005/0146461 A1 | * | 7/2005 | Pande et al. | ............... 342/357.02 |

OTHER PUBLICATIONS

Khattatov, B., et al.; *Ionospheric Corrections from a Prototype Operational Assimilation and Forecast System*; Position Location and Navigation Symposium, 2004, PLANS 2004 Monetary, CA. Apr. 26-29, 2004 Piscataway NJ, IEEE Apr. 26, 2004, pp. 518-526.

Bradley, P. A. et al., Perspectives on updated $f_oF2$ maps for IRI Advances in Space Research, Pergamon, Oxford, GB, Sep. 11, 2004 pp. 2067-2074.

International Search Report dated Oct. 27, 2006 issued in a corresponding foreign application.

* cited by examiner

*Primary Examiner*—Carol S Tsai
(74) *Attorney, Agent, or Firm*—Cohen Pontani Lieberman & Pavane LLP

(57) ABSTRACT

A method for characterizing a state of a planetary atmosphere or of a part of the atmosphere, especially of the ionosphere of the earth includes determining values of an ionization state, especially of an electron density and/or of an electron content, in the atmosphere or in the part of the atmosphere as a function of a location variable and as a function of a time variable and determining at least one characteristic quantity for the atmosphere or the part of the atmosphere. The characteristic quantity is determined on the basis of the values of the ionization state found for the atmosphere or the part of the atmosphere.

17 Claims, 7 Drawing Sheets

DETERMINATION OF AN ATMOSPHERIC STATE

BACKGROUND OF THE INVENTION

The present invention relates to a method and an arrangement for determining the state of a planet's atmosphere or part of the atmosphere, especially of the ionosphere of the earth.

The ionosphere of the earth has a significant impact on the propagation of radio waves. Accordingly, the state of the ionosphere has a significant impact on the transmission of information by electromagnetic radiation as is conventional in the fields of telecommunications and satellite-based navigation.

SUMMARY OF THE INVENTION

The task of the present invention is to provide a method and an arrangement which increases the accuracy and reliability of communications and navigation systems which are based on the transmission of information by radio waves in planetary atmospheres.

The present invention proposes a process for characterizing a state of a planetary atmosphere (or of a part of the atmosphere). The "part" of the atmosphere in question is in particular the ionosphere of the earth. In the process, values of an ionization state, especially of electron density and/or of electron content, in the atmosphere or in the part of the atmosphere are determined (especially by measurement) as a function of a location variable and as a function of a time variable;

at least one characteristic quantity is determined for the atmosphere or for the part of the atmosphere; and the characteristic quantity is determined on the basis of the values of the ionization state found in the atmosphere or in the part of the atmosphere.

This characteristic quantity can therefore be used to characterize the state of the atmosphere or the state of the part of the atmosphere. That is, the characteristic quantity can provide useful information which describes the state of the atmosphere and which is suitable for various possible applications. The characteristic quantity can therefore also be called a parameter or index. In particular, it is possible to determine a value for the parameter which is characteristic of the state of the entire atmosphere or of the entire part of the atmosphere at a certain time or in a certain time period (even in the future).

To obtain the characteristic quantity, a single value of the characteristic quantity which is characteristic of a sub-area of the atmosphere and/or for a period of time is preferably determined in each case on the basis of a large number of values of the ionization state. For example, values of the ionization state can be averaged over the sub-area and/or over the period of time. In a simple case, therefore, the characteristic quantity is an average value of the status variable which describes the ionization state and is valid for the sub-area and/or the period of time in question.

In a preferred elaboration of the invention, a value of the characteristic quantity is determined as described in the preceding paragraphs for each of a plurality of different sub-areas of the atmosphere and for a plurality of time periods. It is therefore possible, for example, to prepare a map (or equivalent data records) of the ionosphere or of a part thereof, where each map contains values which are informative with respect to the propagation of radio waves.

The present invention comprises a physically based numerical method for expressing the disturbance behavior of the ionosphere over space and in time, which method makes it possible to increase the accuracy and reliability of communications and navigation systems.

Information and thus measurement data concerning the state of the ionosphere may be acquired from satellite-based measurements and from measurements at ground stations. The measurement data alone, however, which are derived by various observation methods and which are usually distributed inhomogeneously over space and time, do not make it possible to describe the ionosphere effectively.

Therefore, specific characteristic quantities which describe the system behavior of the ionosphere are derived, which can be used advantageously in subsequent applications, including quantitative ones.

One possibility of such an application is the prediction of the characteristic quantity, that is, in predicting the future. It is thus possible, for example, to predict the characteristic quantity for a future point in time or a future period of time on the basis of the values determined for the ionization state.

The present invention can serve in particular to derive physically-founded ionospheric characteristic quantities automatically, which can then be subjected to further processing in quantitative evaluation procedures or in industrial applications, which can be added as options. Even a single derived characteristic quantity can be used as an input value and/or as input information for data processing, especially for automatic data processing, such as that carried out in industrial/technical systems for estimating significant factors resulting from disturbances in the ionosphere. Accordingly, the characteristic quantities (especially in the form of compressed data) can enter effectively into models of the ionosphere, into current analyses of its state, and into predictions of its state.

The method, especially in the form in which it is executed automatically in its entirety, is intended to be universally applicable. All of the information necessary for the derivation of the compressed data can be acquired from satellite-based or ground-based measurements.

Preferred status variables of the ionization state are the electron density and the electron content. These variables can be determined by evaluation of, for example, radio waves, especially of the propagation time and/or of the carrier phase radio waves. A method of this type is described in the article by N. Jakowski from 1996, cited at the end of the descriptive part of the specification.

An effective description of the atmosphere can be achieved in particular by forming derivatives with respect to space and/or time of the electron density and/or electron content in defined areas (especially sub-areas of the ionosphere) and by compressing the data thus obtained spatially and/or temporally in a suitable manner. For example, this is done by the assimilation of all available ionospheric data from ground-based and/or satellite-based measurement networks and/or local in situ measurement into sufficiently accurate models of the ionosphere for describing the electron content (especially two-dimensional) and/or the electron density (three-dimensional). The information can also be compressed by other means, however. In general, "compression" is understood to mean that the quantity of data is reduced with respect to its spatial and/or temporal aspect.

In addition, a method and an arrangement for determining a state of a planetary atmosphere or of a part of the atmosphere are proposed, which have one or any desired combination of the following features. A "part" of the atmosphere is understood to mean in particular a layer of the atmosphere or again a part of such a layer. The term "atmosphere", when used in the following, is to be understood in particular to mean a part of the atmosphere:

at least one characteristic quantity of the atmosphere is determined;

the characteristic quantity should be a characteristic quantity of a physical state of the atmosphere;

the characteristic quantity can have a single value, which describes the state of a location in the atmosphere, of a part of the atmosphere (especially of a part of the ionosphere or of the entire ionosphere), or of the entire atmosphere; in particular, the characteristic quantity can be a mean value covering the part of the atmosphere or the atmosphere; the value describes in particular the state at a point in time or over a period of time; the value can, for example, be a mean time value or a median or a value which is typical of a time interval;

the characteristic quantity can be derived from the distribution of charge carriers in space (especially electrons), known as the charge carrier density, where the charge carriers are located in the atmosphere (plasma of the ionosphere);

the characteristic quantity can be derived from the total content of charge carriers in the part of the atmosphere and/or of the atmosphere;

several characteristic quantities can be determined and combined with each other to form a new characteristic quantity;

the characteristic quantity can be a one-dimensional characteristic quantity; and the characteristic quantity can describe the spatial and/or temporal change of a physically meaningful status variable of the atmosphere (especially on the basis of the partial derivatives with respect to space and/or time) or can be determined from such change.

A corresponding arrangement is designed to fulfill at least one of the previously cited functions. The arrangement may be realized, for example, by a computer or by a computer system and/or by a corresponding computer program.

It is conceivable that characteristic quantities could be determined which depend indirectly on the state of the ionosphere (but are not determined from measurements of the ionization state of the atmosphere), but which also depend, with respect to their properties, on technical factors of the measurement procedure during the data acquisition process (e.g., measurement of the intensity and phase of radio signals) and therefore depend on properties of the technical system being used. These characteristic quantities are thus valid for only a certain class of applications. Because of the dispersive nature of the ionosphere, these measured characteristic quantities are also frequency-dependent. An example of such a characteristic quantity is the so-called "scintillation index", which is determined from the range of variation of a radio wave signal over time. In contrast, it is proposed here that the characteristic quantity be determined from values (especially measurement values) of the ionization state of the atmosphere. Because the ionization state is a physical state and therefore is a state which depends only on nature and not on measuring instruments, and because the characteristic quantity is derived from the ionization state, the characteristic quantity according to the present invention can also be called an "objective" characteristic quantity. The characteristic quantity is independent of the way in which the specific measuring device functions.

The method therefore preferably delivers parameters of state which describe the instantaneous state of the atmosphere, especially of the ionosphere. For this purpose, data of different degrees of spatial resolution can be read out from databases (e.g., those containing stored measurement data for the atmosphere) or saved to them in real time and then processed.

To compensate for the disadvantages of the inhomogeneous way in which the data are distributed, it is possible (and preferred) to conduct a "data assimilation" (the intersection of data with a model, as will be explained later). The information concerning the state of the ionosphere (especially local, regional, or global: see below) acquired in this way or acquired in some other way can be compressed in such a way that complex relationships are reduced to one-dimensional parameters. The term "local" or an area of corresponding size is understood to mean in particular a part of the earth's atmosphere which measures at least 10 km in latitude and longitude. "Regional" or a corresponding area is understood in particular to be a part of the earth's atmosphere which measures at least 1,000 km in latitude and longitude.

Assimilating the data into a model, however, is not the only possibility. For example, tomographic solutions without the support of a model may also be used, especially when very large quantities of data are involved.

To support the determination of the values of the ionization state (reconstruction of the spatial-temporal distribution of the ionization), it is possible to use a physical (e.g., empirical or theoretical) model, which describes the electron content or the electron density in the atmosphere or in the part of the atmosphere, where the model uses a spatial and temporal quantization of the atmosphere or of the part of the atmosphere, and which has especially a grid point network. A location or volume in the atmosphere or in the part of the atmosphere corresponds to each discrete location or partial volume of the model. A current or future value of a variable reconstructed by means of the model, e.g., a variable of the electron density or of the electron content, is assigned to each location or partial value.

In accordance with the method proposed above, an arrangement for characterizing a state of a planetary atmosphere or of a part of the atmosphere, especially of the ionosphere of the earth, is proposed, where the arrangement comprises the following:

a device for determining an ionization state, which device is designed especially to find values of an electron density and/or of an electron content in the atmosphere or in the part of the atmosphere as a function of a location variable and as a function of a time variable; and a device for determining characteristic quantities, which device is designed to determine at least one characteristic quantity for the atmosphere or a part of the atmosphere, where the characteristic quantity is determined on the basis of the values of the ionization state obtained for the atmosphere or for the part of the atmosphere.

To increase reliability and accuracy, certain knowledge of the spatial and temporal behavior of the atmosphere, especially of the ionosphere, may be required to implement the arrangement and/or the method. Because of the complexity of the behavior of the atmosphere, it is advisable to use characteristic atmosphere quantities which are able to describe system-critical properties quickly and sufficiently. The propagation properties of the radio waves are determined by the index of refraction. This physical parameter is a primary characteristic quantity which can be replaced by other physical status variables in correspondence with the relationships described by the index of refraction. Thus the index of refraction of the propagation medium (i.e., the ionosphere) can also be expressed as a first approximation by the plasma frequency or by the electron density. In this case, the dependence of the refraction on frequency must be taken into account; that is, the index of refraction varies with the frequency of the radio waves. This is a circumstance which considerably restricts the generalization of a characteristic quantity, but it can be tolerated in the case of fixed, predetermined frequencies (e.g., in the case of GPS). In contrast, the electron density or its integral along the ray path (TEC) represents an objective parameter of state of the propagation medium. The ionospheric irregularities responsible for signal disruptions can be expressed as a first approximation not only by the level of the electron density but also by its temporal and spatial gradients. Higher derivations are possible and also suitable as parameters. Parameters of state such as the plasma temperature or the drift speed of the plasma are parameters of state of the ionospheric plasma, but they impact the refraction of the radio waves only indirectly, so that they do not offer significant advantages and are also difficult to measure. In principle, the spatial extent of the disruptions is to be taken into account; for this reason local, regional, or global parameters can be advantageous, depending on the concrete application.

An approach with a completely physical foundation is preferably adopted, and compressed data on the spatial-temporal behavior of the ionosphere are used. The information is in the form of, for example, at least one characteristic quantity.

In addition, quality control can also be implemented to enhance the input data iteratively. The method is preferably automated. The "compression" of the data is understood to mean the reduction of the information to an expression which is characteristic of the state of the atmosphere, and in the extreme case it means reduction to a single value.

The method can be a method for the operational and automatic derivation of physical data on the state of the ionosphere. It should be able to process large quantities of data concerning the state of the ionosphere rapidly and automatically and to compress the data into manageable parameters pertaining to the current state of the ionosphere. Ground-based and/or satellite-based ionospheric measurements in an incompletely allocated spatial matrix with x columns, and y rows, and z levels can be included in the corresponding processing operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
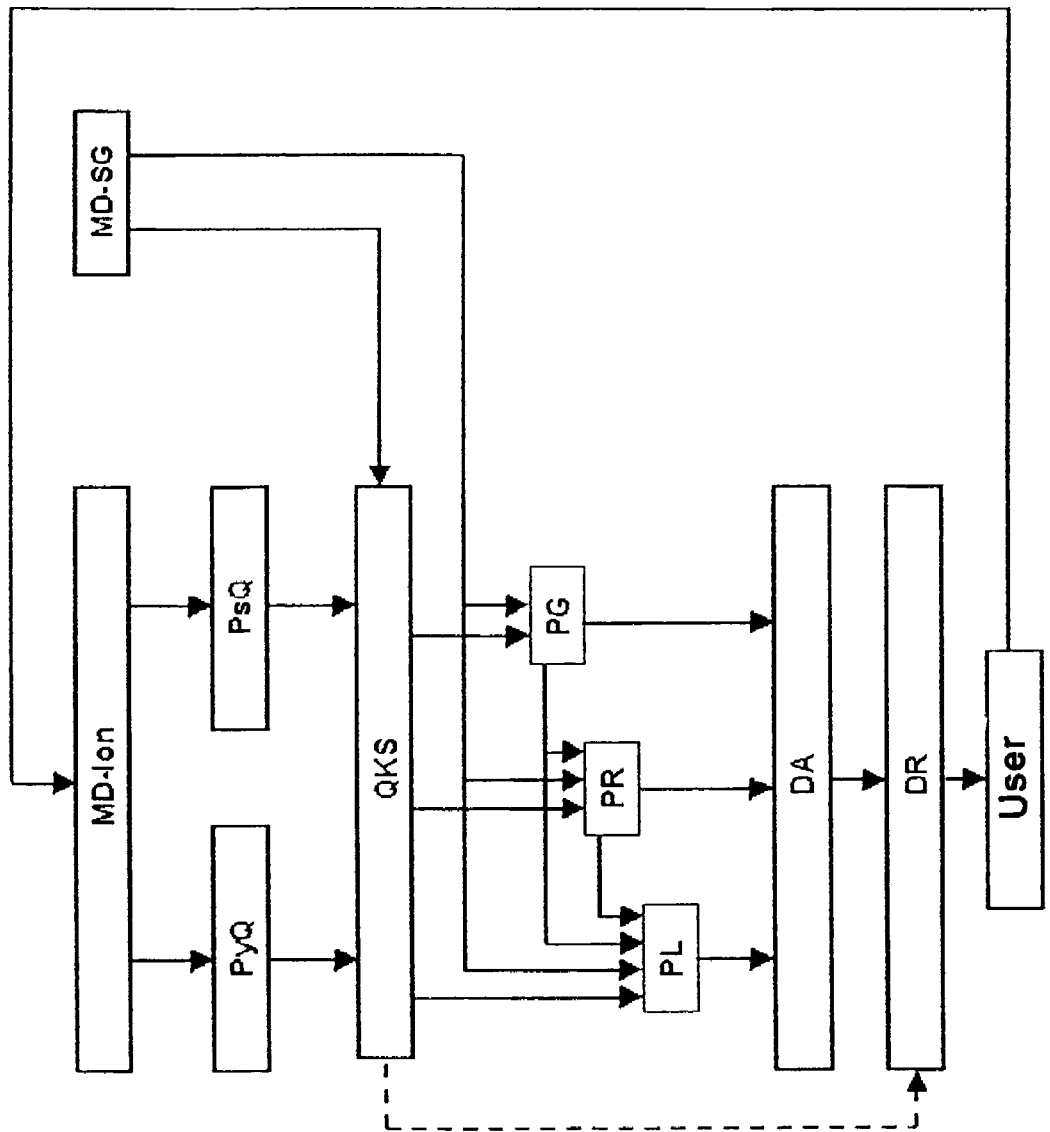
FIG. 1 shows an arrangement for characterizing a state of a planetary atmosphere.

FIG. 1 shows an arrangement of modules for executing a method of characterizing a state of a planetary atmosphere. The arrangement for executing the method can have various subprocessors, which are connected to each other as modules (as illustrated in FIG. 1), such as one or more of the following modules, which will be discussed in greater detail further below: a physical quality control module (PyQ), a statistical quality control module (PsQ), a quality enhancement, calibration, and control device module (QKS), various spatial-temporal processors including a local processor (PL), a regional processor (PR), and a global processor (PG) (see also FIG. 2), a data assimilation module (DA), and a production module referred to as a data reduction module (DR). The modules can access, for example, two independent data resources: an atmospheric measurement data resource, especially of the ionosphere (MD-Ion) and solar and/or geomagnetic measurement data resource (MD-SG).

FIG. 1 also shows a block which represents a user of the arrangement or of the method. The user receives results from the data reduction module DR, but he can also supply input data. Input data can also be supplied in particular by GPS services as well.

The following description pertains not only to this type of modular structure of the arrangement but also correspondingly to the combination of steps executed during the implementation of the method. When a module is optional, the corresponding steps of the method are also optional.

Physical quality control module (PyQ) can use irregularities of the signal structure (e.g., phase discontinuities) and/or a series of measurement data to detect faulty measurements. Once detected, the PyQ excludes the faulty measurements from further processing.

For this purpose, the measurement variables can be converted to physical variables (e.g., by mathematical conversion, transformation, and/or by the use of look-up tables) and checked for plausibility, that is, to ensure that no physically determinable value ranges are exceeded.

Statistical quality control module (PsQ) analyzes time series and outliers can be identified as deviations from statistical values (e.g., standard deviations) and excluded from further processing. For this purpose, statistical temporal and/or spatial analyses can be carried out.

The quality enhancement module (QKS) can detect the vacancies which have been created by the PyQ and PsQ modules and fill them (e.g., by interpolation). To minimize measurement value noise, smoothing procedures can be applied. For this purpose, mathematical and statistical filters can be used.

Calibration is an optional integrated processing step, which can eliminate sensor-specific properties in the measurement data. Models and model assumptions or known system parameters can be used for this.

The QKS module is also able to react to data such that the QKS module can call up the necessary auxiliary parameters such as solar and/or geomagnetic data from databases (e.g., corresponding to a user requirement, such as a spatial resolution entered by the user) and make them available for further processing. They also serve to provide input data (e.g., solar flux) for the models possibly used in this module (e.g., for calibration).

Various spatial and temporal processor modules PL, PR, PG are used in the exemplary embodiment. It is also possible, however, to use a different number of processors, and in particular it is possible to use only a single processor. The processors can all have the same substructure with two submodules, for example, in each case. One of the submodules deals with the case in which the data are to be processed in a following step by a local two-dimensional model of the atmosphere. The other submodule handles the case in which the data are to be further processed by a local three-dimensional model of the atmosphere. The processor modules PL, PR, PG adapt the input data to the boundaries of a sub-area of the atmosphere, wherein the data are to be processed only insofar as necessary to cover this sub-area. By means of the processor modules PL, PR, PG, the data assimilation module DA can be set up to handle all sub-areas universally. Alternatively, however, it is also possible to use an arrangement in which a single module carries out the model calculations.

In particular, the models describe the electron content or the electron density in the sub-area being considered. The model can comprise calculations based on a local two-dimensional or local three-dimensional grid point network, where a location in the atmosphere and a value of the modeled variable (e.g., the electron density) are assigned to each point on the grid. The processors (PL, PR, PG) adapt the network density of the calculation model to the spatial extent of the one-to-three dimensional study space (e.g., grid spacing adjustment, area expansion).

Spatial and temporal processor modules and the corresponding models, however, are not absolutely necessary to implement the invention. For example, sufficient data for determining a characteristic quantity may already be present on the basis of existing measurement data. These measurement data are in particular spatially structured data, that is, data in which individual measurement values are each assigned to a location in the atmosphere. For this reason, an arrow leads from quality enhancement module QKS directly to data reduction module DR in FIG. 1.

If, however, additional data are to be determined from measurement data which have local gaps or an inhomogeneous distribution, optimum use can be made of the measurement data by assimilating the data into one of the models. In particular, values (e.g., electron density values) are assigned to previously unused grid points.

Local Processor Module PL:

This processor uses a local model, which describes a part of the atmosphere, especially the ionosphere, in some suitable way. The range of validity of the model and its boundary conditions are locally limited (e.g., to the range of the measuring station).

Its boundary zone values can be determined by a regional model (fitting of a local model into a regional model).

In the simplest case, the input data are adapted to or selected for the local conditions. For the subsequent assimilation, it is then necessary to use an external model (e.g., international reference ionosphere) or to reconstruct them without a model, using a tomographic approach.

Regional Processor Module PR:

This processor uses a regional model, which describes a part of the atmosphere, especially of the ionosphere, in some suitable way. The range of validity of the model and its boundary conditions are regionally limited (e.g., to a locally three-dimensional part of the atmosphere).

Its boundary zone values can be determined by a global model (fitting of a regional into a global model).

In the simplest case, the input data are adapted to or selected for only the regional conditions. For the subsequent assimilation, it is then necessary to use an external model (e.g., international reference ionosphere) or to reconstruct the data without model, using a tomographic approach.

Global Processor Module PG:

This processor uses a global model, which describes a complete layer of the atmosphere, especially the ionosphere, in some suitable way. The range of validity of the model and its boundary conditions are globally limited. In the simplest case, the input data are adapted to or selected for only the global conditions. For the subsequent assimilation, it is necessary then to use an external model (e.g., international reference ionosphere) or to reconstruct the data without a model, using a tomographic approach.

Data Assimilation DA:

The data assimilation module aims at the one-to-three dimensional reconstruction of a status variable (characteristic quantity), especially the electron density and/or the electron content, as a homogeneous function of the location in the atmosphere and/or of time. For this purpose, the measured data are assimilated into the model described above, i.e., a model which corresponds to the specific set of requirements in question. If a sufficient data density is present, a complete reconstruction can be accomplished without a model by the use of a tomographic method. In principle, the methods of reconstruction known from meteorology can also be used. This also includes the possibility of predicting the future behavior of the ionosphere.

Data-Reduction Module DR:

The current ionization state of the ionosphere can be described preferably by one of the following status variables: the electron density $N_e$ or the total electron content (TEC). TEC is defined here as the integral of the electron density $N_e$ along the ray path s from, for example, an altitude of approximately 50 km (the beginning of the ionosphere) to the plasma pause altitude $h_{pp}$:

$$TEC = \int_{50}^{h_{pp}} N_e \cdot ds \qquad (1)$$

In the case of satellite-based measurement (e.g., Global Positioning System, i.e., GPS measurements), $h_{pp}$ is replaced by the altitude of the satellite $h_{sat}$.

Figure 2:
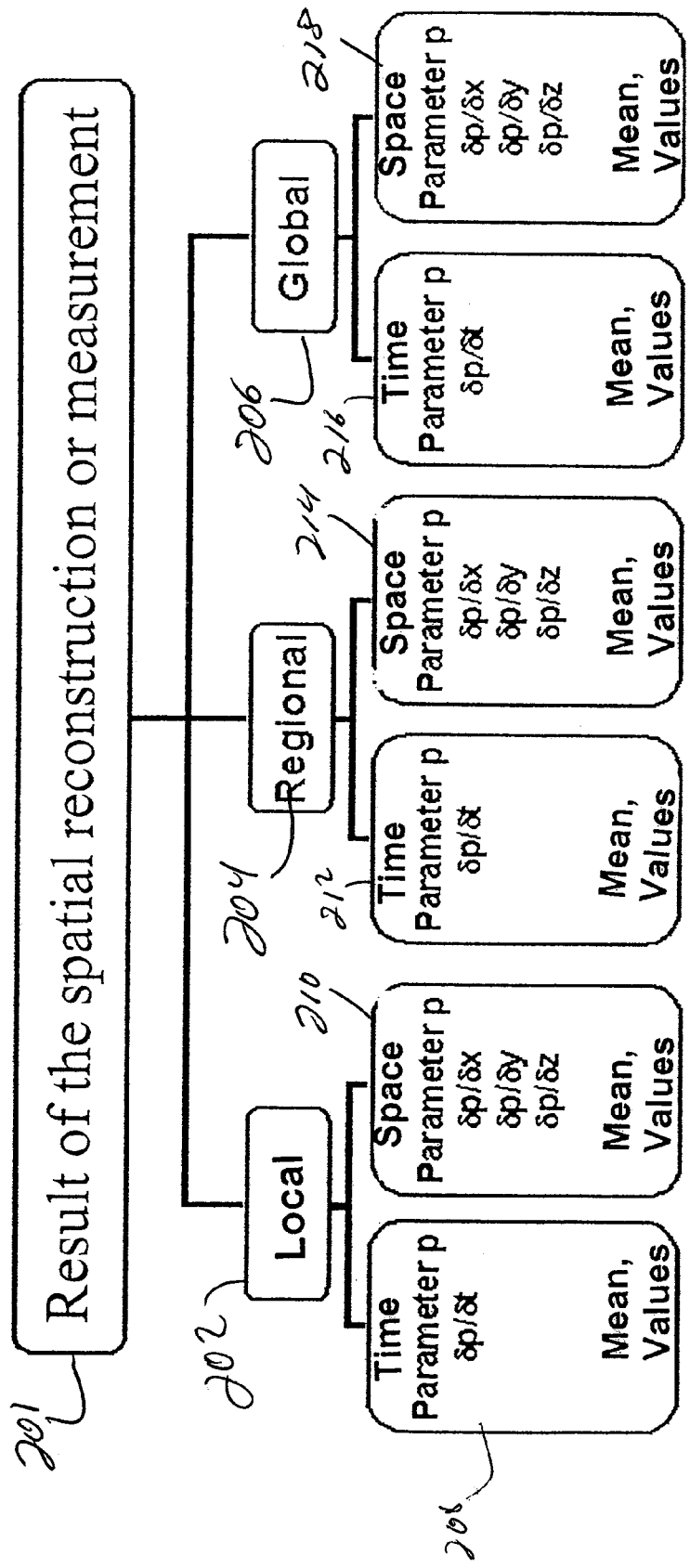
FIG. 2 is a schematic diagram of possibilities for determining characteristic quantities.

Because characteristic quantities are used preferably for the simple and rapid evaluation of dynamic processes, it is logical to use characteristic quantities of the ionosphere which provide information on local and/or temporal changes (especially changes in status variables of the ionosphere such as the total electron content TEC and the electron density $N_e$) to derive the compressed data. Depending on the database being used, these characteristic quantities can apply to the local, to the regional, or to the global area. FIG. 2 offers a summary of this. The characteristic quantities are selected primarily so that they already contain data in a form close to that in which they will actually be used (e.g., the distance error in GPS is directly proportional to the TEC as a first approximation).

Referring to FIG. 2, a diagram of obtaining a result of a spatial reconstruction or measurement 201 is show. The starting variables (e.g., status variables) for the characteristic quantities are designated parameters p or derived parameters p'. The parameters p can be, for example, the previously defined status variables, namely, the electron density $N_e$ and the total electron content TEC. The derived parameters p' can be, for example, the standard deviation (designated σ or RMS) or a difference between the parameter p and a reference parameter value $p_{ref}$ (e.g., the spatial mean value $\bar{p}$ of the parameter p over a defined region). A result of the "spatial reconstruction", that is, of a model calculation (e.g., of one of the models cited above), and/or measurement data are available as input information for the determination of the minimum of one characteristic quantity. The input information comprises, for example, one or more status variables as a function of the location and/or the time for considered region.

In general, it is true for the present invention that an additional status variable can be derived in turn from each of the original status variables (which can be defined as a function of the location in the atmosphere, so that a field of values of the status variables exists). The status variable can also itself be the characteristic quantity. Thus the characteristic quantities defined according to FIG. 2 can themselves enter the system as parameters p. Thus the standard deviation ($\sigma$ or RMS) from a mean value $\bar{p}$ can be formed both as a function of time at a fixed location in a certain time window and as a function of space at a fixed time in a defined area (where N is the number of data points, e.g., in a time interval $N_T$ or in a spatial distribution $N_R$; i is the running index; and t is the time):

$$\sigma(t)^2 = \frac{1}{N_T - 1} \sum_{i=1}^{N_T} (p_i(t) - \overline{p(t)})^2 \quad (2)$$

The above Equation (2) is the definition of a dynamic characteristic of state at a fixed location or over a defined area.

$$\sigma(\lambda, \varphi)^2 = \frac{1}{N_R - 1} \sum_{i=1}^{N_R} (p_i(\lambda, \varphi) - \overline{p(\lambda, \varphi)})^2 \quad (3)$$

The above Equation (3) is the definition of a spatial structure property at a certain time or in a defined time interval.

Other linkages are also possible, such as for example, the sum of the squares of the standard deviations with respect to the geographic longitude $\lambda$ and with respect to the geographic latitude (designated $\phi$ or $\Phi$) at a certain time t:

$$\sigma(\lambda,\phi)^2 = \sigma(\lambda)^2 + \sigma(\phi)^2 \quad (4)$$

For example, from a first partial derivative (with respect to location or time) of a parameter or a derived parameter, an additional partial derivative can be formed, e.g., the second partial derivative with respect to the same local coordinate or a mixed partial derivative. Additional, higher partial derivatives are also possible. Partial derivatives are designated $\delta p/\delta j$. In FIG. 2, j can stand, for example, for the time t, one of the local coordinates x, y, or z, or for some other defined local coordinate. In the case of FIG. 2, the local coordinates x are defined as the geographic latitude $\phi$, y as the geographic longitude $\lambda$, and z as the altitude above the surface of the planet (e.g., above sea level).

In addition, the diagram shown in FIG. 2 is also divided up in correspondence with the areas introduced above, namely, "local" 202, "regional" 204, and "global" 206. For all areas, derivatives can be obtained with respect to time t 208, 212, 216 and with respect to each of the local coordinates x, y, and z 210, 214, 218 (insofar as they are defined for the area, which can also be a locally one-dimensional area).

These characteristic quantities 208-218 can then be further combined with the help of suitable methods to form mean or median values (indicated in FIG. 2 by the terms "mean values", "medians") to obtain representative information for a time window or a spatial area. Thus, in the interests of the most effective possible utilization, local, regional, and planetary characteristic quantities can be formed. For example, a mean value can be formed from each of the derivatives or higher derivatives, e.g., the standard deviation according to one of the above-cited definitions or some other mean value.

In addition to the characteristic quantity, the length of the time intervals and the size of the spatial areas considered for the calculations should also be defined as usefully as possible. Rules could be made for this purpose on the international level in the form of international standards or recommendations (e.g., ITU-R).

Fundamental ionospheric parameters (which can be both status variables of the atmosphere and possible characteristic quantities according to the invention) are, for example, the above-defined TEC and the electron density. Characteristics quantities which can be derived from them are, for example, the standard deviation of a fundamental ionospheric parameter or the difference between such a parameter and a reference value (e.g., mean time value, averaged, for example, over a month) of the parameter.

The characteristic values calculated according to the diagram shown in FIG. 2 deliver in particular an effective description of the disturbance of radio waves in the state of the ionosphere described by the input data (for local, regional, and/or global applications, depending on the area being considered).

Figure 3:
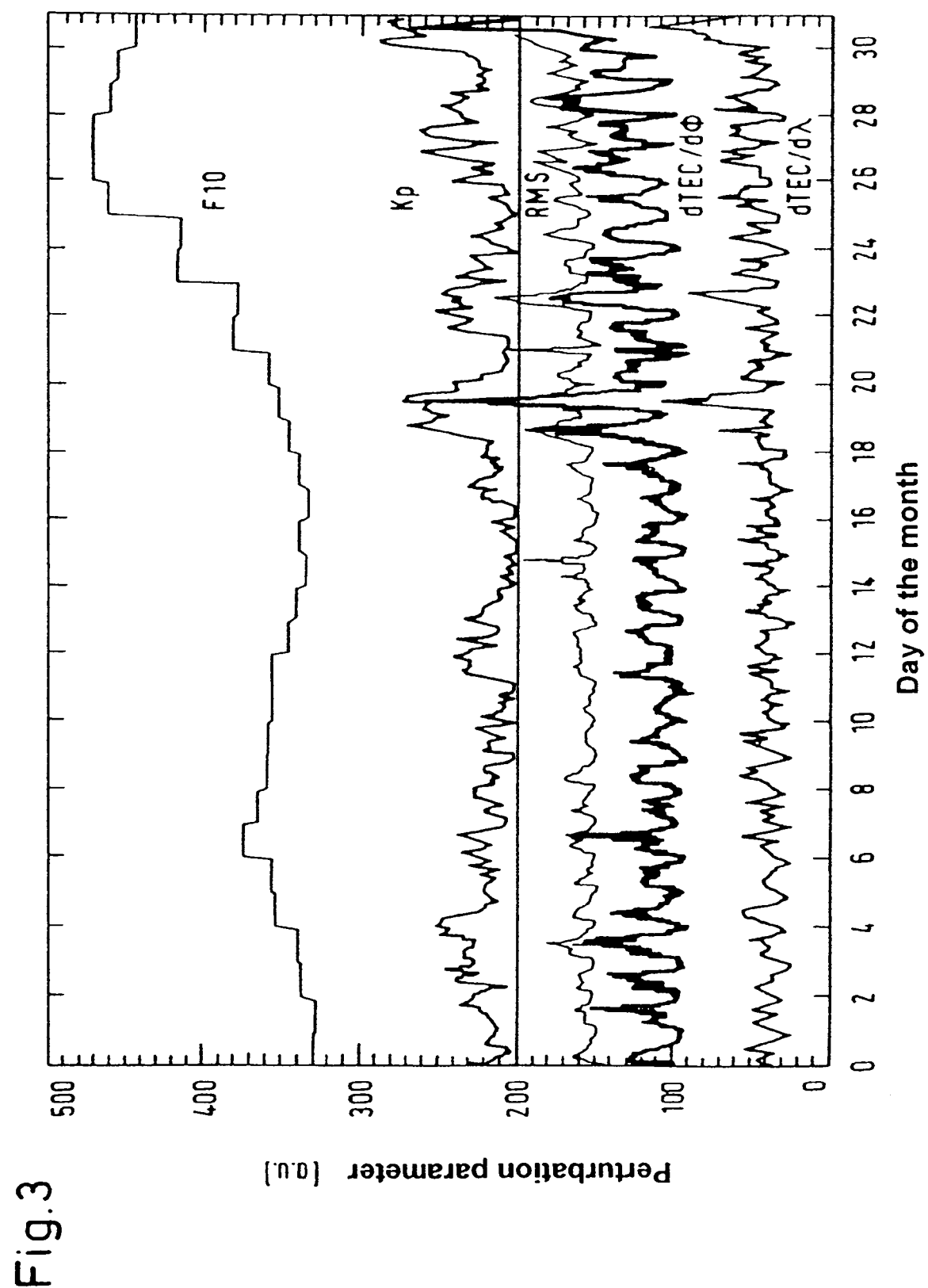
FIG. 3 shows a diagram of various characteristic quantities and other variables as functions of time.

FIG. 3 shows a diagram of various types of characteristic quantities, which were derived from ground-based measurements of the European GPS network of the International GPS Service (IGS). In addition, F10 designates solar activity, and Kp designates geomagnetic activity. All values are mean values over time intervals of three hours. Arbitrary units (a.u.) are plotted on the vertical axis of the diagram, which is labeled with the general formulation "perturbation parameters". FIG. 3 shows the following characteristic quantities: the derivative with respect to time of the TEC (maximum value from a regional area, in this case Europe), the average deviation from the TEC background model NTCM1 used for the assimilation (see Appendix), the standard deviation RMS from the TEC background model, the derivative of the TEC with respect to the geographic latitude $\phi$ (maximum value over Europe), and the derivative of the vertical TEC with respect to the geographic longitude $\lambda$ (maximum value over Europe). In analogy to the three-hour averages for the geomagnetic Kp index, values of each the cited characteristic quantities have also been averaged over 3-hour periods. The total of seven functions ("parameters of state") are shown as a function of time (in analogy to Kp, averaged over 3-hour periods) for the entire month of March 1995.

As could be demonstrated, there is a significant correlation between the geomagnetic and the ionospheric parameters because of the intense interconnection between magnetospheric and ionospheric processes. The periodicity of the characteristic quantities over the course of a day is striking. If this represents a significant limitation on ability to evaluate the disturbance, the differential parameter $\Delta p_{abs} = p - p_{ref}$ or $\Delta p(\%) = (p - p_{ref})/p_{ref} \times 100$ can be used to define a characteristic quantity which is largely independent of the daily changes.

Figure 4:
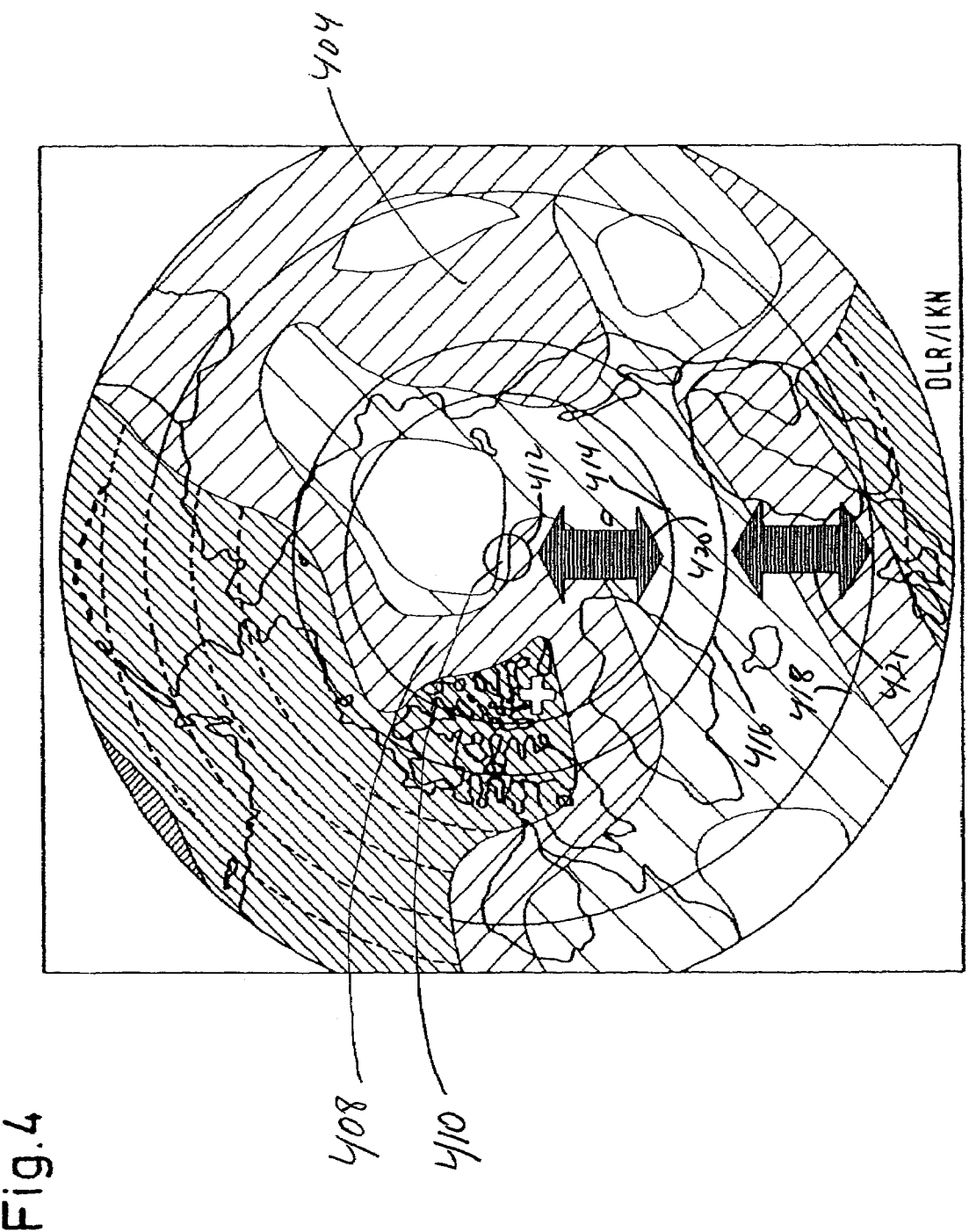
FIG. 4 shows several sub-areas of the earth's atmosphere, bounded by circular lines, under which is a map of part of the northern hemisphere of the earth with the north pole at the center of the map.

In the following, an example of the definition and use of characteristic ionospheric quantities for precise GNSS applications is provided. "GNSS" stands for satellite-based global navigation satellite systems such as GPS and Galileo. FIG. 4 shows definition areas 404, 408 around the north pole 410 of the earth (in the center of the diagram) for two area-related characteristic ionospheric quantities. Various types of characteristic quantities corresponding to FIG. 2 can be defined in the zones illustrated. FIG. 4 shows an example of zone selection suitable for defining the value range of two-dimensional characteristic quantities (rings bounded by circles): the "Aurora Zone" (57.5-70.0° north latitude) and the "polar cap" (75.0-87.5° north latitude). The polar cap zone 408 is bounded on its inner edge by the smallest circle 412 and on its outer edge by the next-larger circle 414. The "Aurora Zone" 404 is bounded on its inner edge by the next-larger circle 416 and on its outer edge by the largest circle 418. The extent of the zones in the direction of the meridian in the diagram of FIG. 4 are marked by wide, dark double arrows 420, 421. Areas with approximately constant values for an ionospheric characteristic (here the area-related electron density) are surrounded by boundary lines and cross-hatched to a greater or lesser degree or not at all depending on the size of the value. Under the areas or zones, it is also possible to see the outlines of land areas such as coastlines.

Figure 5A:
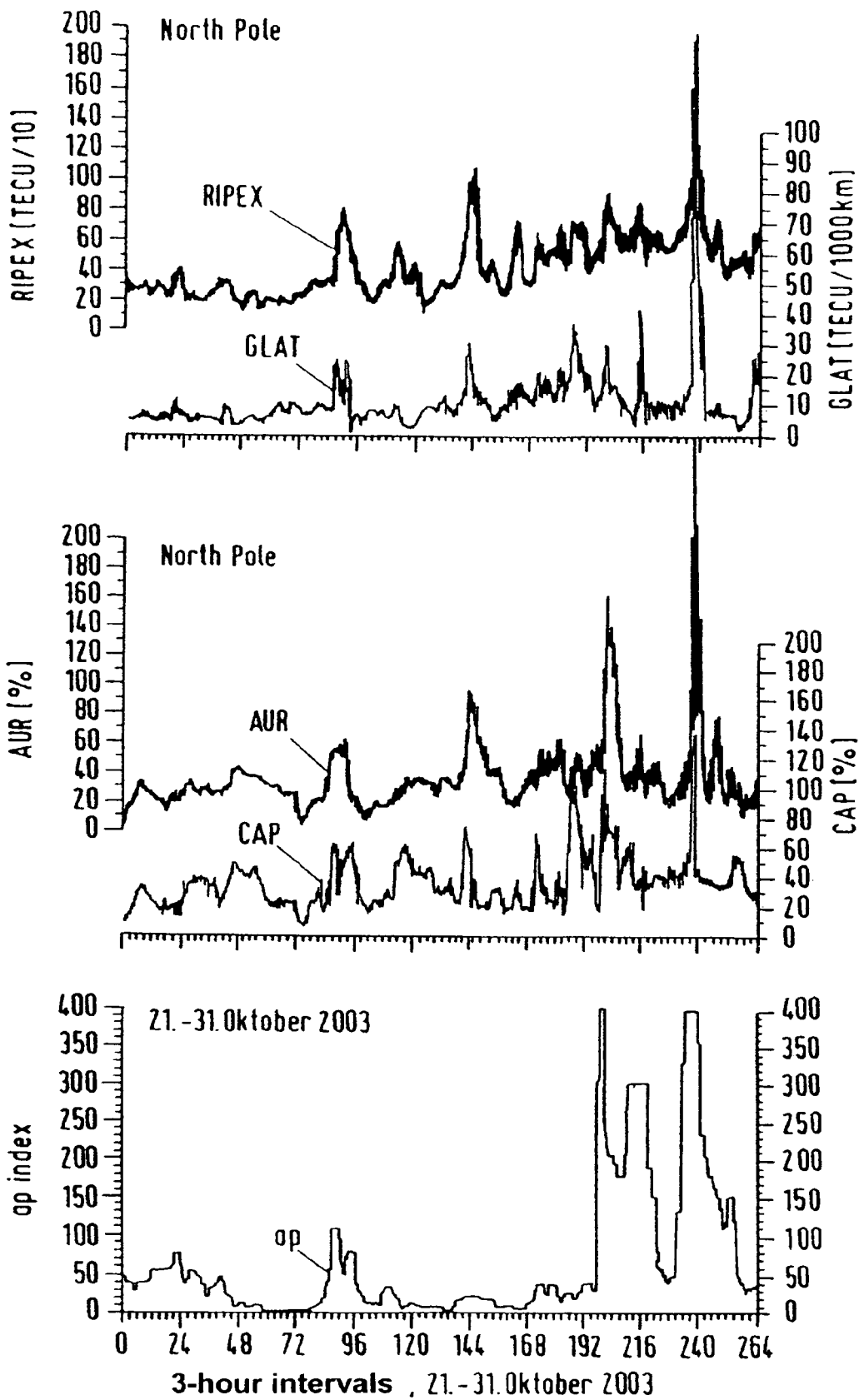
FIGS. 5a and 5b show ionospheric disturbance parameters in comparison with a time-averaged (three-hour) geomagnetic activity parameter.
Figure 5B:
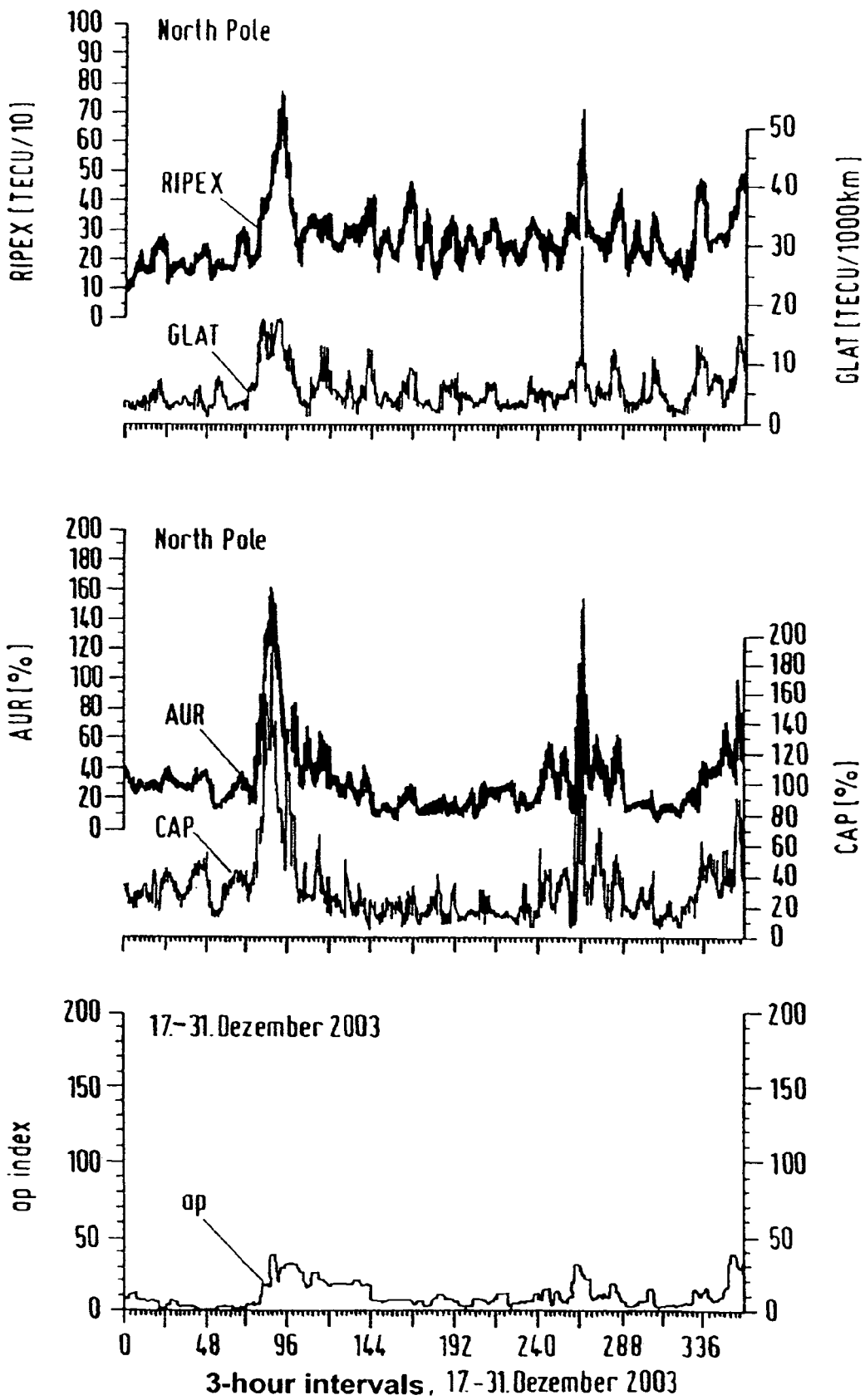

The characteristic quantities derived during strong ionospheric disturbances (characterized in particular by wide spatial and/or temporal variations in the electron density) in October and December 2003 for the two polar areas are shown in FIGS. 5a and 5b. The figures show characteristic ionospheric disturbance quantities in comparison with the three-hour geomagnetic activity parameter $a_p$ during geomagnetically disturbed periods in October and December 2003.

FIGS. 5a and 5b show a total of six diagrams. Each of the three diagrams in FIG. 5b, arranged one above the other, and each of the three diagrams in FIG. 5a, arranged one above the other, show the same characteristic quantities but for different periods of time. The time period of the three diagrams of FIG. 5a pertains to a period (horizontal axis) from the 21st to the 31st of Oct. 2003. The period of the three diagrams of FIG. 5b pertains to a period (horizontal axis) from the 17th to the 31st of Dec. 2003.

In the two upper diagrams of FIGS. 5a and 5b, a characteristic quantity RIPEX is plotted as a function of time. During the data assimilation process, RIPEX is derived from the deviations of the measurement data from the selected background model. RIPEX is in practice the dispersion or standard deviation of all of the TEC measurements of the polar background model first calibrated in QKS and then transformed onto the vertical axis. The dispersion is measured here in 0.1 TECU (TEC unit=$1\times10^{16}$ electrons/m$^2$). The curve GLAT immediately below that shows the maximum of the northward-oriented latitude gradient (TECU/1,000 km) over the entire (local two-dimensional) area ($\phi>50°$ N).

In the two center diagrams of FIGS. 5a and 5b, area-related percentage deviations from corresponding reference data (monthly medians) are shown for the Aurora Zone "AUR" (upper curve in each case) and the Polar Cap area "CAP" (lower curve in each case). The characteristic quantities are thus independent of the time of day for the two areas and correlate very strongly with the three-hour geomagnetic activity index $a_p$, which is shown in the two lower diagrams of FIGS. 5a and 5b. Comparison of the newly defined characteristic ionospheric disturbance quantities with the geomagnetic activity index $a_p$, however, shows significant differences. This makes it clear that autonomic characteristic quantities are required for precise, safety-critical applications which depend on the state of the ionosphere. Although elevated geomagnetic characteristic quantities such as the geomagnetic activity index $a_p$ signal an increased probability of the occurrence of ionospheric disturbances, they are not sufficient to describe the disturbance potential of the ionosphere satisfactorily.

Problems with radio communications and with navigation and surveying services significant for telecommunications and navigation applications occurred on the 29th and 30th of Oct. 2003.

Through comparison with a set of reference data, the characteristic quantities in the middle diagrams are almost completely independent of the time of day. This independence can be advantageous for the characterization of the physical state of the disturbance.

The differing nature of these characteristic quantities is obvious. It is remarkable that, in spite of the weak geomagnetic activity in December 2003, the percentage characteristic quantities AUR and CAP in the middle diagrams of the two time intervals being considered do not differ very much with respect to their amplitude. This means that here, too, ionospheric disturbances can be described only qualitatively by geomagnetic characteristic quantities. Specific ionospheric indices will be needed in the future.

To obtain the best-possible estimate of the situation for a specific application, the choice of the type of characteristic quantity can depend on the concrete task. If a suitable choice is made, one obtains a rapid and informative index of the observed disturbance, which can be used then in ionosphere-sensitive technical systems for positional evaluations.

The inventive arrangement can use data from one or more of the following data resources as input data (see also FIG. 1): (1) a database and/or an operational database network in which ionospheric measurement data are available (MD-ION); and (2) a database and/or an operational database network in which external, non-ionospheric measurement data are stored (MD-SG). The operational, area-covering data may comprise the integral electron densities, obtained from, for example, two-frequency GPS measurements, which can be derived from the measurement of the propagation parameters of radio waves (e.g., propagation time). The operational, area-covering data may alternatively or additionally comprise local in situ measurements, combined measurements, radar measurements and/or measurements of propagation parameters of the radio waves. The external, non-ionospheric measurement data may comprise data for characterizing solar-terrestrial relationships (e.g., solar and geomagnetic activity).

During the further processing of the data, products are ultimately generated in correspondence with the described arrangement, which are utilized directly by a user of the arrangement or of the method. If the user is, for example, a GPS service, the user can simultaneously also supply input data from its own GPS ground stations. This offers the advantage that the derived ionosphere data can fulfill the requirements of the user in the most effective way possible.

In a more general case of the design of the present invention, at least one characteristic quantity can be used in the operation of a device which is operationally dependent on radio waves which propagate through the atmosphere or through a part of the atmosphere.

In particular, the device can be a satellite-based global positioning system, where, under consideration of the characteristic quantity, a decision is made not to use the signals of certain satellites of the system, to use them on only a limited basis, or to correct them. If, for example, it is found that there is a disturbance in a certain sub-area of the ionosphere, and if the signals of the satellite in question would pass through this sub-area on their way to the receiver, a decision can be made to ignore the signals of this satellite in the position-determination process and instead to use the undisturbed signals of one or more other satellites. These other signals are, for example, signals from a satellite which would not normally be used during conventional operation of the GPS receiver, because its geometric configuration is less favorable for positioning than the position of the excluded satellite.

Applications of the determined characteristic quantities values can, as mentioned, be found in the area of satellite-based navigation. In communications, the characteristic quantities can be used, for example, in prediction models for radio wave propagation (radio prognosis) and/or to control the quality and stability of factors which impair communications links. In navigation, the characteristic quantities values can be used, for example, to obtain estimates of the potential of the ionosphere to cause errors and interference in satellite-based global navigation satellite systems (GNSS) such as GPS and Galileo. In addition, the characteristic quantities can provide an effective index of the degree of ionospheric disturbance in differential GNSS applications and can therefore be in particular a component of integrity data for Galileo, for example. This is important for high-precision, safety-critical applications. The characteristic quantities values can be used, furthermore, to predict ionospherically-caused disturbances in positioning and are thus important again for high-precision, safety-critical applications.

In the following, a preferred exemplary embodiment of a model for data assimilation is described, where the model can be referred to as a "regional TEC model". In principle, of course, any other one-to-three dimensional model can be chosen if preference is being given to a model-based reconstruction of the characteristic quantities. If the model is a prediction model, the data assimilation yields a prediction of the future behavior of the ionization or of the characteristic quantities.

The regional TEC model of the ionosphere allows calculation of the total electron content (TEC) over the European region (20° W<λ<40° E; 30° N<ϕ<70° N). It was developed to serve as a background model for the generation of a TEC map (see Jakowski et al., references from 1994, 1996, 1998 listed below). TEC maps are generated by assimilating TEC measurements of ground-based GPS measurements into a background model such as the NTCM. The TEC values measured at the receiver usually travel along an angled path to the receiver and are thus transformed into a vertical TEC (normalization).

The model approximates changes of the vertical TEC as a function of the input variables location, time, and solar activity and is based on a set of annually updated coefficients, which are derived from measurements of the IGS network. The model itself is a polynomial with 60 coefficients:

$$TEC = \sum_{i=1}^{5} \sum_{j=1}^{3} \sum_{k=1}^{2} \sum_{l=1}^{2} H_i(h) \, Y_j(d) \, L_k(\phi, \lambda, h, d) \, S_l(F10)$$

where $H_i(h)$ describes the daily and semi-daily variation, $Y_j(d)$ the annual and semi-annual variation, $L_k(\phi, \lambda, h, d)$ the dependence on the solar zenith angle and the magnetic latitude, and $S_l(F10)$ the dependence on solar activity.

To cover the polar regions (here ϕ>50° N, ϕ>50° S), a polar TEC model (NTCMP) has been developed. This model, which is very similar to the NTCM, is used as a background model for the generation of polar TEC maps.

The standard deviation with respect to monthly median values is less than 3.5 TECU for high solar activity and less than 1.5 TECU for low solar activity in the areas considered.

The basic features of the data assimilation used here are described in the Jakowski, reference from 1998 listed below. The entire content of the two articles, published in 1998, is herewith included in the present specification.

Figure 6:
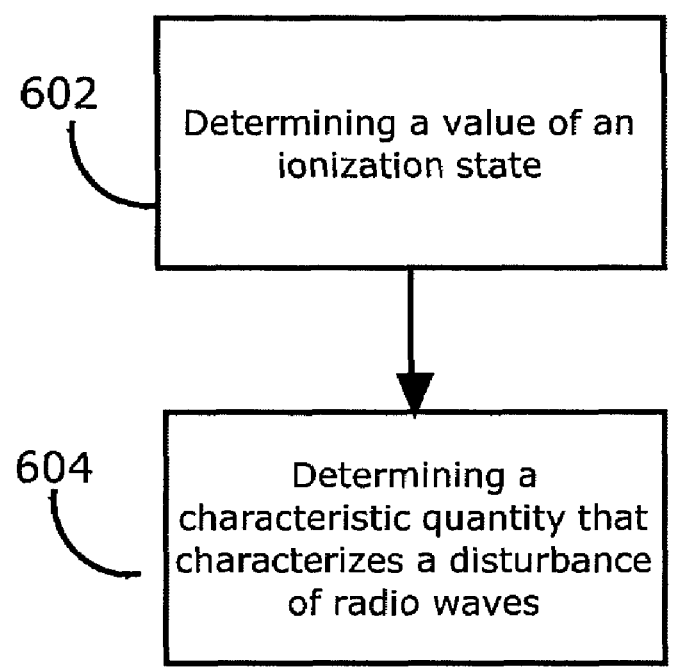
FIG. 6 is an illustrative flow diagram of a method for characterizing a state of a planetary atmosphere.

Referring to FIG. 6, is an illustrative flow diagram of a method for characterizing a state of a planetary atmosphere is shown. The method includes determining (i.e., by measurement) values of an ionization state, especially of electron density and/or of electron content, in the atmosphere or in the part of the atmosphere as a function of a location variable and as a function of a time variable (Step 602). The method further includes determining at least one characteristic quantity that characterizes a disturbance of radio waves for the atmosphere or for the part of the atmosphere based on the values of the ionization state found in the atmosphere or in the part of the atmosphere (Step 604).

REFERENCES

1. Jakowski, N. and A. Jungstand, A., Modeling the regional ionosphere by using GPS observations, Proceedings of the International Beacon Satellite Symposium, Aberystwyth (UK), 11.-15. Jul. 1994.

2. Jakowski, N., TEC monitoring by using satellite positioning systems, in Modern Ionospheric Science, (Eds. H. Kohl, R. Rüster, K. Schlegel), EGS, Katlenburg-Lindau, ProduServ GmbH Verlagsservice, Berlin, pp. 371-390, 1996. Note: this article describes a preferred possibility for determining values of the ionization state of the atmosphere.

3. Jakowski, N., E. Sardon, and S. Schlüter, GPS-based TEC observations in comparison with IR195 and the European TEC model NTCM2, Adv. in Space Res., 22, 803-806, 1998.

4. Jakowski, N., Generation of TEC maps over the COST area based on GPS measurements, Proc. 2nd COST251 Workshop (Ed. A. Vernon), 30-31 Mar. 1998, Side, pp 51-57, 1998.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform. substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for characterizing a state of one of a planetary atmosphere and a part of the planetary atmosphere, comprising the steps of:

determining a value of an ionization state in the one of the planetary atmosphere and the part of the planetary atmosphere as a function of a location variable and as a function of a time variable; and determining a characteristic quantity that characterizes a disturbance of radio waves for the one of the planetary atmosphere and the part of the planetary atmosphere from the determined value of an ionization state;

wherein the characteristic quantity is determined from at least one of a spatial derivative of a physical quantity of the atmosphere, a temporal derivative of a physical quantity of the atmosphere, the electron density of the atmosphere, the electron content of the atmosphere, and deviation and standard deviation from corresponding reference data of a status quantity of the atmosphere.

2. The method of claim 1, wherein said step of determining a characteristic quantity comprises determining a value of the characteristic quantity for one of a specified time and a specified space of the one of the planetary atmosphere and the part of the planetary atmosphere.

3. The method of claim 1, wherein said step of determining a characteristic quantity comprises predicting, for a point in time or period of time in the future, a characteristic quantity of the one of the planetary atmosphere and the part of the planetary atmosphere based on the determined value of the ionization state.

4. The method of claim 1, wherein said step of determining the characteristic quantity comprises determining a derivative of an electron density or an electron content in the one of the atmosphere and in the part of the atmosphere with respect to at least one of time and space, and determining the characteristic quantity based on the derivative.

5. The method of claim 4, wherein said step of determining the characteristic quantity includes evaluating the derivatives with respect to space, wherein the derivatives with respect to space comprise gradients in the direction of one of the geographic latitude and the geographic longitude of the planet.

6. The method of claim 1, wherein said step of determining the characteristic quantity comprises using knowledge concerning a behavior of the atmosphere in one of space and time.

7. The method of claim 1, wherein said step of determining a value of an ionization state comprises using a physical model which describes one of an electron content and an electron density in the of the one of the planetary atmosphere and the part of the planetary atmosphere, wherein the physical model uses a spatial and temporal quantization of the one of the planetary atmosphere and the part of the planetary atmosphere using in particular a grid point network, wherein a location or a volume area in the one of the planetary atmosphere and the part of the planetary atmosphere corresponds to each discrete location or partial volume of the model, and wherein a current or future value of a variable reconstructed by the physical model is assigned to each location or partial volume.

8. The method of claim 1, wherein the value of the ionization state comprises an electron density or electron content determined by evaluation of one of propagation time of radio waves and a phase of carrier waves.

9. The method of claim 8, wherein said step of determining a value of an ionization state comprises evaluating radio waves in a satellite-based global positioning system.

10. The method of claim 1, further comprising the step of using the determined characteristic quantity in the operation of a device which operates based on electromagnetic waves which propagate through the one of the planetary atmosphere and the part of the planetary atmosphere.

11. The method of claim 10, wherein the device is part of a satellite-based positioning system or is used in combination with the satellite-based positioning system, said method further comprising the step of deciding not to use the signals of certain satellites, to use the signals only on a limited basis, or to correct the signals based on the determined characteristic quantity.

12. The method of claim 1, wherein said step of determining a value of an ionization state comprises determining one of an electron density and an electron content of the one of the planetary atmosphere and the part of the planetary atmosphere.

13. The method of claim 1, wherein the one of the planetary atmosphere and the part of the planetary atmosphere is the ionosphere of the earth.

14. A system for characterizing a state of one a planetary atmosphere and a part of the planetary atmosphere, comprising:
 a device configured for determining a value of an ionization state in the one of the planetary atmosphere and the part of the planetary atmosphere as a function of a location variable and as a function of a time variable; and
 a device configured for determining a characteristic quantity that characterizes a disturbance of radio waves for the one of the planetary atmosphere and the part of the planetary atmosphere from the determined value of the ionization state;
 wherein the characteristic quantity is determined from at least one of a spatial derivative of a physical quantity of the atmosphere, a temporal derivative of a physical quantity of the atmosphere, the electron density of the atmosphere, the electron content of the atmosphere, and deviation and standard deviation from corresponding reference data of a status quantity of the atmosphere.

15. The system of claim 14, wherein said device for determining a value of an ionization state determines one of an electron density and an electron content of the one of the planetary atmosphere and the part of the planetary atmosphere.

16. The system of claim 14, wherein the planetary atmosphere and the part of the planetary atmosphere is the ionosphere of the earth.

17. The system of claim 14, further comprising a device that operates based on electromagnetic waves which propagate through the one of the planetary atmosphere and the part of the planetary atmosphere, wherein the device that operates based on electromagnetic waves is part of a satellite-based positioning system or is used in combination with the satellite-based positioning system, said system further comprising a device configured for deciding not to use the signals of certain satellites, to use the signals only on a limited basis, or to correct the signals based on the determined characteristic quantity.

* * * * *